Patented Mar. 16, 1948

2,437,853

UNITED STATES PATENT OFFICE 2,437,853

PREPARATION OF DIHYDROXANTHOPTERIN AND XANTHOPTERIN

George H. Hitchings, Tuckahoe, N. Y., assignor to Burroughs Wellcome & Co. (U. S. A.) Inc., New York, N. Y., a corporation of New York No Drawing. Application December 1, 1943, Serial No. 512,479

3 Claims. (Cl. 260—251)

The present invention relates to a method of preparing dihydroxanthopterin and xanthopterin from 5-chloroacetamino-2,4-diamino-6-hydroxypyrimidine.

One object of the invention is to produce dihydroxanthopterin in a process giving a high yield.

Another object of the invention is a treatment of 5-chloroacetamino-2,4-diamino-6-hydroxypyrimidine, to form dihydroxanthopterin which may be converted to xanthopterin by catalytic oxidation.

Still a further object is to prepare dihydroxanthopterin in a simple and efficient method giving a high yield from 5-chloroacetamino-2,4-diamino-6-hydroxypyrimidine.

The starting material to be used in the process according to the invention may be prepared by heating 2,4,5-triamino-6-hydroxypyrimidine

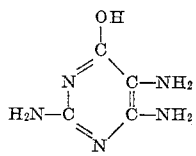

with an excess of chloroacetic acid and purifying to obtain 5-chloroacetamino-2,4-diamino-6-hydroxypyrimidine

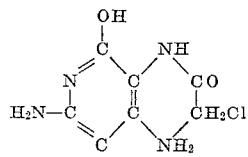

This product is heated with an aqueous solution selected from the group consisting of aqueous sodium bicarbonate, disodium phosphate and sodium carbonate to induce ring closure and to form dihydroxanthopterin

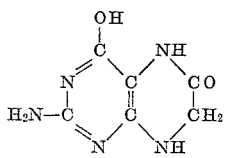

However, with the stronger alkalies such as sodium carbonate and sodium hydroxide, considerable amounts of impurities are formed, and it is preferred to effect the ring closure with sodium bicarbonate. The dihydroxanthopterin may be converted to xanthopterin

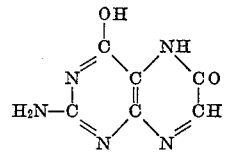

by catalytic oxidation in known manner.

The invention is illustrated by the following example:

4 gm. of 2,4,5-triamino-6-hydroxypyrimidine were ground with 12 gm. chloroacetic acid. The mixture was heated in a closed vessel, in which a slight vacuum was maintained, to 85° C. for 15 minutes. The mixture was extracted with benzene and washed with benzene and ether. The residue was recrystallized from 100 ml. of 0.2 molar acetate buffer at pH 5.0 to give 5.6 gm. (83% of the theoretical) of 5-chloroacetamino 2,4-diamino-6-hydroxypyrimidine.

4.73 gm. of the purified product and 2.88 gm. sodium bicarbonate were dissolved in 100 ml. of boiling water and heated for 2¼ hours on a boiling water bath. 15 ml. of normal acetic acid solution were added and the crystalline material was filtered off and dried. This weighed 2.26 gm. (62.5% of the theoretical quantity) and a further quantity was deposited in the filtrate on standing.

1.17 gm. dihydroxanthopterin were recrystallized from 300 ml. of glacial acetic acid with 200 mg. decolorizing carbon. 1.08 gm. of pure compound were obtained.

The purified dihydroxanthopterin was converted into xanthopterin by catalytic oxidation in the known manner.

What is claimed is:

1. The process of preparing dihydroxanthopterin comprising the steps of heating 5-chloroacetamino - 2,4 - diamino - 6 - hydroxypyrimidine with excess sodium bicarbonate, and recovering dihydroxanthopterin.

2. The process of preparing dihydroxanthopterin comprising the steps of heating 5-choloroacetamino - 2,4 - diamino - 6 - hydroxypyrimidine with an aqueous sodium bicarbonate solution and recovering dihydroxanthopterin.

3. The process of preparing dihydroxanthopterin comprising the steps of heating 5-chloroacetamino-2,4-diamino-6-hydroxypyrimidine in a boiling water bath with an aqueous sodium bicarbonate solution and recovering dihydroxanthopterin.

GEORGE H. HITCHINGS.

REFERENCES CITED

The following references are of record in the file of this patent:

FOREIGN PATENTS

| Number | Country | Date |
|--------|---------|------|
| 206,454 | Germany | 1907 |
| 209,729 | Germany | Feb. 27, 1908 |

OTHER REFERENCES

Chem. Abstracts, vol. 35, pages 2147–48.